(12) United States Patent
Sun

(10) Patent No.: US 7,063,076 B1
(45) Date of Patent: Jun. 20, 2006

(54) METHOD OF SMOKE LIMITING ENGINE

(75) Inventor: Min Sun, Windsor (CA)

(73) Assignee: Detroit Diesel Corporation, Detroit, MI (US)

(*) Notice: Subject to any disclaimer, the term of this patent is extended or adjusted under 35 U.S.C. 154(b) by 0 days.

(21) Appl. No.: 11/129,804

(22) Filed: May 16, 2005

(51) Int. Cl.
F02D 41/30 (2006.01)
F01N 3/00 (2006.01)

(52) U.S. Cl. .................. 123/478; 123/681; 123/492

(58) Field of Classification Search .............. 123/436, 123/675, 681–682, 478, 492–493, 568.11, 123/568.14; 701/103–105, 108–110; 60/274, 60/278, 285
See application file for complete search history.

(56) References Cited

U.S. PATENT DOCUMENTS

| | | | |
|---|---|---|---|
| 4,147,141 A | 4/1979 | Nagano | |
| 5,201,303 A | 4/1993 | Kojima | |
| 5,617,726 A | 4/1997 | Sheridan et al. | |
| 5,732,688 A | 3/1998 | Charlton et al. | |
| 6,016,788 A | 1/2000 | Kibe et al. | |
| 6,029,451 A | 2/2000 | Gärtner | |
| 6,112,729 A | 9/2000 | Barnes et al. | |
| 6,142,119 A | 11/2000 | Abe et al. | |
| 6,148,616 A | 11/2000 | Yoshida et al. | |
| 6,151,547 A | 11/2000 | Kumar et al. | |
| 6,155,240 A | 12/2000 | Amano et al. | |
| 6,209,530 B1 | 4/2001 | Faletti et al. | |
| 6,227,182 B1 | 5/2001 | Muraki et al. | |
| 6,244,256 B1 | 6/2001 | Wall et al. | |
| 6,247,446 B1 | 6/2001 | Fassler et al. | |
| 6,247,462 B1 | 6/2001 | Wild et al. | |
| 6,305,167 B1 | 10/2001 | Weisman, II et al. | |
| 6,321,732 B1 | 11/2001 | Kotwicki et al. | |
| 6,508,237 B1 | 1/2003 | Romzek et al. | |
| 6,568,173 B1 * | 5/2003 | Kolmanovsky et al. | ....... 60/280 |
| 6,578,546 B1 * | 6/2003 | Schultalbers et al. | ....... 123/300 |
| 6,662,795 B1 | 12/2003 | Baldwin et al. | |
| 6,820,599 B1 | 11/2004 | Kurtz et al. | |
| 2002/0038541 A1 | 4/2002 | Sumilla et al. | |
| 2002/0099496 A1 | 7/2002 | Weisman, II et al. | |
| 2002/0100460 A1 | 8/2002 | Romzek et al. | |
| 2003/0034018 A1 | 2/2003 | Baldwin et al. | |
| 2004/0061290 A1 | 4/2004 | Gray, Jr. | |
| 2004/0083715 A1 | 5/2004 | Le Leux et al. | |
| 2004/0144079 A1 | 7/2004 | Nagai et al. | |
| 2004/0168431 A1 | 9/2004 | Goralski, Jr. et al. | |

FOREIGN PATENT DOCUMENTS

| | | | |
|---|---|---|---|
| EP | 1 460 251 | * | 9/2004 |
| JP | 9-126060 | * | 5/1997 |
| JP | 2001-355493 | * | 12/2001 |
| JP | 2005-155331 | * | 6/2005 |

* cited by examiner

*Primary Examiner*—Hai Huynh
(74) *Attorney, Agent, or Firm*—Brooks Kushman P.C.

(57) ABSTRACT

Method of smoke limiting an engine. The method may include determining a minimum air/fuel (AFR) ratio and fuel limiting as a function thereof. The method may include determining a maximum fueling rate as a function of the minimum AFR and air mass flow to the engine. The method may include controlling the engine according to a requested fueling rate unless the requested fueling rate is greater than the maximum allowable fueling rate.

23 Claims, 2 Drawing Sheets

| | 0 | 600 | 750 | 900 | 1050 | 1200 | 1350 | 1500 | 1650 | 1800 | 1950 | 2100 | RPM |
|---|---|---|---|---|---|---|---|---|---|---|---|---|---|
| 0 | | 23.00 | 23.00 | 23.00 | 23.00 | 23.63 | 23.71 | 23.77 | 23.84 | 23.89 | 23.95 | 24.00 | |
| 12.5 | | 23.00 | 23.00 | 23.00 | 23.00 | 23.63 | 23.71 | 23.77 | 23.84 | 23.89 | 23.95 | 24.00 | |
| 25 | | 23.00 | 23.00 | 23.00 | 23.00 | 23.61 | 23.68 | 23.75 | 23.81 | 23.87 | 23.93 | 23.98 | |
| 37.5 | | 23.00 | 23.00 | 23.00 | 23.00 | 23.52 | 23.59 | 23.66 | 23.72 | 23.78 | 23.83 | 23.88 | |
| 50 | | 23.00 | 23.00 | 23.00 | 23.00 | 23.28 | 23.35 | 23.41 | 23.47 | 23.53 | 23.58 | 23.63 | |
| 62.5 | | 23.00 | 23.00 | 23.00 | 23.00 | 22.77 | 22.84 | 22.89 | 22.95 | 23.00 | 23.04 | 23.08 | |
| 75 | | 23.00 | 23.00 | 23.00 | 23.00 | 19.00 | 19.00 | 19.00 | 19.00 | 20.00 | 20.00 | 20.00 | |
| 87.5 | | 23.00 | 23.00 | 23.00 | 23.00 | 17.00 | 17.00 | 17.00 | 17.00 | 17.00 | 17.00 | 17.00 | |
| 100 | | 18.00 | 18.00 | 18.00 | 18.00 | 17.00 | 17.00 | 17.00 | 17.00 | 17.00 | 17.00 | 17.00 | |
| Load (%) | | | | | | | | | | | | | |

METHOD OF SMOKE LIMITING ENGINE

BACKGROUND OF THE INVENTION

1. Field of the Invention

The present invention relates to methods and systems of smoking liming an engine.

2. Background Art

Federal Test Procedures (FTP) for engines may included tests related to analyzing smoke emission during varying operating conditions. Such smoke control tests may be directed towards determining black smoke emissions associated with poor air/fuel ratios (AFRs). The ability to control AFR during testing is critical to controlling smoke spikes and other undesirable engine emissions.

Boost-based smoke control is one AFR control methodology that relies on boost pressure to set an AFR that is appropriate for smoke control, i.e., one which limits or otherwise controls the amount smoked produced, such as to facilitate passing the above-identified emissions testing. Boost-based smoke control typically relies on boost pressure as an indicator of how much fresh air is available for combustion and determines the AFR as a function thereof. But, this method is limited to environments where no exhaust gas recirculation (EGR) is used since it is only in those environments that the trapped air in the engine cylinders is approximately proportional to the boost.

SUMMARY OF THE INVENTION

One non-limiting aspect of the present invention relates to a method of controlling an internal combustion engine having exhaust gas recirculation (EGR) capabilities. The method may include determining a minimum smoke limiting air/fuel ratio (AFR), determining a maximum allowable fueling rate as a function of the minimum AFR and air mass flow rate to the engine, and controlling the engine according to the maximum allowable fueling rate if a requested fueling rate is greater than the maximum allowable fueling rate. The smoke limiting AFR being determined as a function of engine load to limit black smoke emissions and the air mass flow rate may compensate for EGR flow to the engine.

The method may include determining the minimum AFR as a function of an limited-increment load. The limited-increment load may differ from requested engine load. For example, the limited-increment engine load may increase over time in response to a step change in requested engine load such that the limited-increment engine load increases gradually relative to the requested engine load, such as at a constant or variable rate and/or as an incremented offset from requested engine load.

The method may include continuously adjusting the AFR, and thereby the maximum allowable fueling rate, as a function of the increasing limited-increment load. The method may include determining the minimum AFR as a function of requested engine load or limited-increment engine load and engine speed. For example, the minimum AFR may be determined from a lookup table as a function of the engine (requested or limited-increment) load and engine speed.

The method may include permitting or preventing EGR flow to the engine as a function of the engine load and engine speed if the engine is controlled according to the maximum fueling rate.

The method may include determining the air flow rate as a function of intake charge mass flow rate and EGR mass flow rate.

One non-limiting aspect of the present invention relates to another method of smoke limiting an engine. The method may include determining a minimum smoke limiting air/fuel ratio (AFR), determining a maximum allowable fueling rate as a function of the minimum AFR and air mass flow rate to the engine, and controlling the engine according to the maximum allowable fueling rate if a requested fueling rate is greater than the maximum allowable fueling rate. The smoke limiting AFR may be determined as a function of an limited-increment load to limit smoke emissions, which may be determined as a function of requested engine load.

One non-limiting aspect of the present invention relates to yet another method of smoke limiting an engine. The method may include determining a minimum smoke limiting air/fuel ratio (AFR), determining a maximum allowable fueling rate as a function of the minimum AFR and air mass flow rate to the engine, determining an exhaust gas recirculation (EGR) status as a function of the engine load and speed, and controlling the engine according to the maximum allowable fueling rate and the EGR status. The smoke limiting AFR may be determined as a function of engine load and speed to limit smoke emissions.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

One non-limiting aspect of the present invention relates to an air/fuel ratio-based (AFR-based) smoke control approach for use with exhaust gas recirculation (EGR) engines. Advantageously, the AFR-based smoke-control of the present invention may account for EGR flow and intake manifold temperature changes.

Figure 1:
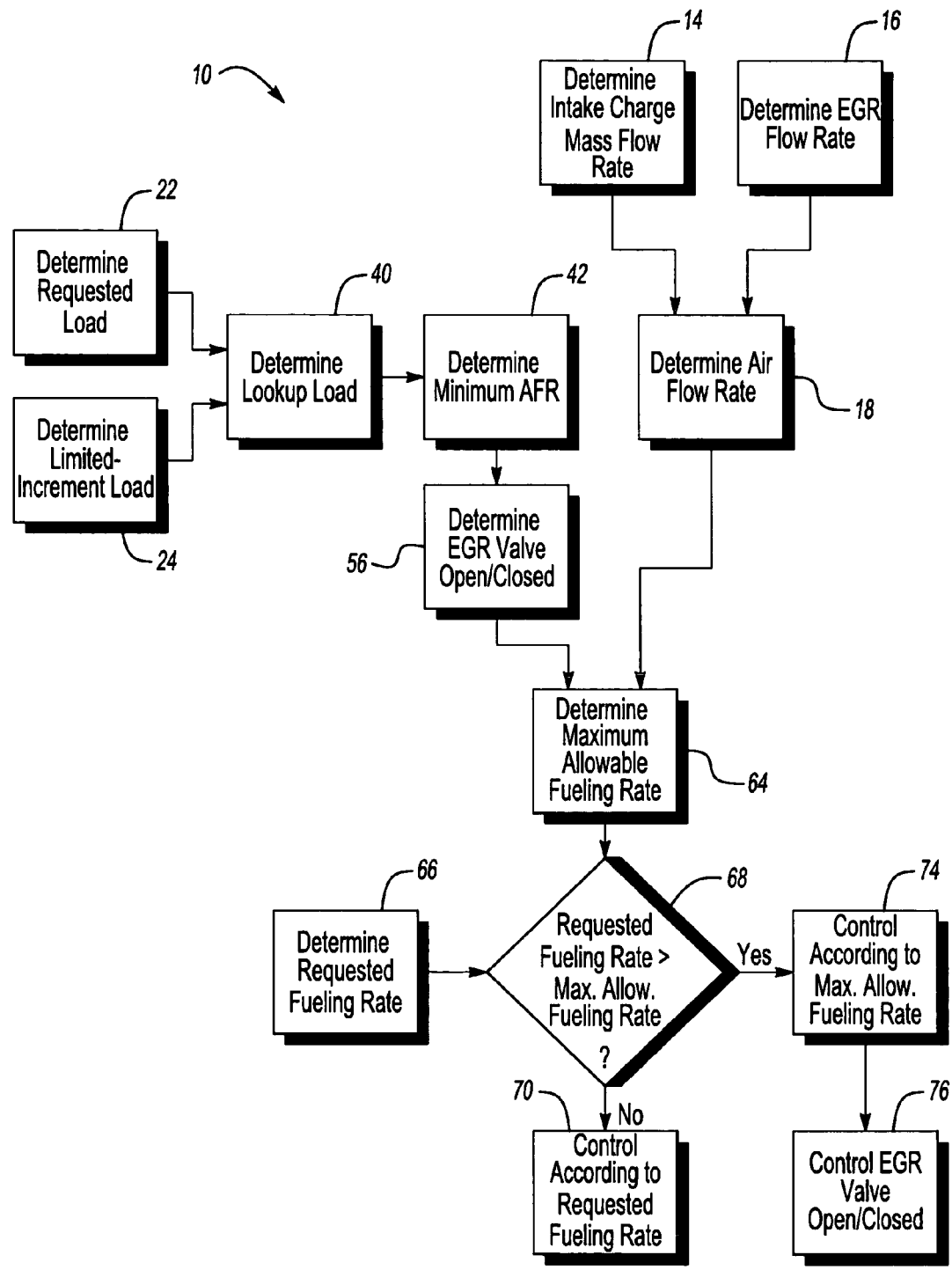
FIG. 1 illustrates a method of controlling an engine in accordance with one non-limiting aspect of the present invention.

One non-limiting aspect of the present invention relates to a method of limiting fueling according to an estimated air flow rate so as to maintain the engine AFR above a pre-specified value, which may correspond with acceptable smoke control levels. FIG. 1 illustrates a flowchart of method of controlling an engine in accordance with one non-limiting aspect of the present invention.

Block 14 relates to determining intake charge mass flow rate to the engine. In accordance with one non-limiting aspect of the present invention, the intake charge mass flow rate may be determined according to the following equation:

$$Vdispl*RPM*Int\_Dens*Vol\_EffidK$$

wherein Vdispl corresponds with volumetric displacement of the engine cylinders, RPM corresponds with the speed of the engine, Int_Dens corresponds with intake charge density, Vol_Effic corresponds with volumetric efficiency of the cylinders, and K corresponds with a conversion constant. The present invention contemplates determining Int_Dens according to any number of inputs and variables, including as a function of a speed-density air mass flow rate model which relies on intake manifold boost (IMP) and intake manifold temperature (IMT), which may be determined from sensors.

Block 16 relates to determining EGR mass flow rate to the engine. The EGR mass flow rate may be determined from any number engine control systems, as one skilled in the art will appreciate. It may be measured, calculated, estimated, or otherwise determined.

Block 18 relates to determining air mass flow rate to the engine as a function of the intake charge mass flow rate and EGR mass flow rate. The air mass flow rate determination may compensate for EGR within the intake charge so as to provide a clearer indication of oxygen levels within the intake gas. The present invention contemplates compensating for EGR gas through any number of operations, including subtracting EGR flow from the intake charge mass flow to determine the air mass flow rate.

The ability of the present invention to estimate air mass flow rates may be more advantageous than measurement based methodologies for controlling AFR during transient conditions because the estimation may provide a better indication of true air mass flow rates, relative to sensor delays associated with measuring the air mass flow rate.

Block 22 relates to determining a requested engine load. The requested engine load may be determined from any number of engine control system, as one skilled in the art will appreciate. For example, the requested engine load may be determined as a function of throttle position (requested loading), such as by measuring throttle pedal position.

Block 24 relates to determining a limited-increment load. The limited-increment load may be different than the requested engine load. The limited-increment load may be determined as a function of a previous engine load. For example, the limited-increment load may correspond with the previous engine load increased by a predefined increment offset. The increment offset may be decreased relative to actual or requested engine load and/or the limited-increment load may be independently increased over time so that the limited-increment engine load approaches or becomes equal to the requested engine load.

In more detail, if the requested engine load experiences a step change, such as when the throttle pedals is rapidly depressed or engine load is otherwise controlled or forced to increase from idle or zero to wide open or through some other large differential, the limited-increment engine load may be gradually increased relative to the requested engine load at predefined increments.

Figures 2, 3:
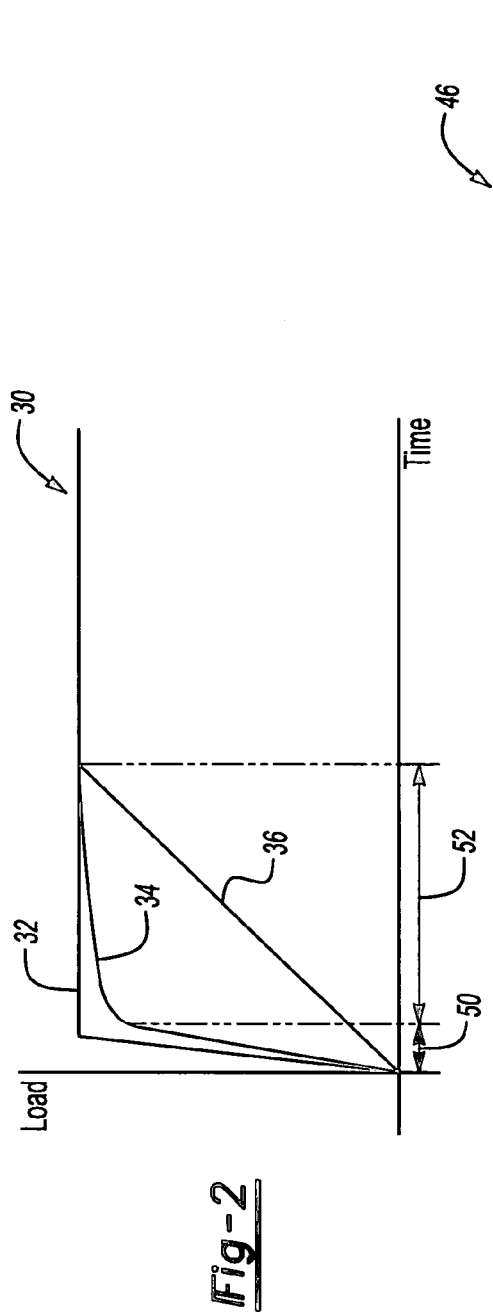
FIG. 2 illustrates one exemplary comparison of requested, actual, and limited-increment load in accordance with one non-limiting aspect of the present invention.
FIG. 3 illustrates a minimum AFR table associated with acceptable AFR values in accordance with one non-limiting aspect of the present invention.

FIG. 2 illustrates a graph 30 one exemplary comparison of requested, actual, and limited-increment load in accordance with one non-limiting aspect of the present invention. A driver may request engine loading by controlling positioning of a throttle pedal, as shown with a requested load curve 32. Engine control algorithms and engine operating parameters may limit actual engine loading to the illustrated actual engine loading curve 34. The limited-increment load may be determined as a function thereof, as shown with limited-increment loading curve 36. A shown, the limited-increment loading curve 36 gradually increases relative to the requested and actual engine loading in a ramping operation. The limited-increment load, as described below in more detail, may be used to facilitate selecting an appropriate AFR.

Block 40 relates to selecting one of the requested engine load or the limited-increment load for use in selecting the appropriate AFR. The present invention contemplates any number of inputs and variables for selecting the requested or limited-increment load, including selecting the lesser of the two. The selected engine load may be referred to, for the purposes of the present invention, as the lookup load.

Block 42 relates to determining a minimum AFR as a function of the lookup load selected in block and the engine speed. These values may be used in conjunction with a minimum AFR table to determine the minimum AFR. FIG. 3 illustrates a minimum AFR table 46 associated with acceptable AFR values.

The table may be a two-dimensional look-up table with speed and load as axes. Steady-state test data indicate that the minimum AFR for a tolerable smoke level varies with engine speed and load. When engine load increases, this minimum AFR decreases, due to more efficient combustion and higher mean in-cylinder temperature at higher load which enhances soot oxidation. If a universal AFR value is used for all the speeds and loads, the smoke limiting will either be too severe for the high loads, or not effective for the low loads.

The allowable minimum AFR specified in the minimum AFR table mainly reflects the AFR limit at steady-state operation. During fast transient operation, such as that which is typical of U.S. FTP and European ETC tests, the AFR suitable for steady-state operation is usually too low to be effective in controlling the resulting smoke spikes, largely due to the lower combustion temperature and larger engine back pressure.

To enhance the transient smoke limiting capability, the algorithm of the present invention may incorporate the lookup load to determine the allowable minimum AFR from the minimum AFR table. This feature may increases the AFR at the beginning of the smoke control event and allow the AFR to decay to the steady state value stored in the calibration table thereafter. Given the characteristic of the minimum AFR table, this results in a higher allowable minimum air/fuel ratio at fast transient than the value specified in steady-state operation, which is important to curtail transient smoke spikes.

The differentiation of this load axis from the requested engine load provides flexibility in managing a "step and ramp" behavior of the limited engine load during fast load acceleration. As illustrated in FIG. 2, during a severe load increase where engine throttle has a step change from idle or zero load to wide open position, the smoke limiting function allows the engine load to step up to about 90% load and then ramp up smoothly to 100%. The slope of a "step" 50 is determined by allowable AFR from the minimum AFR table at low load, while the slope of a "ramp" 52 can be tuned according to the specific engine requirements. This two-stage feature of load acceleration may be very effective in managing the severe transient characteristics, such as high pressure differential across the engine and lower engine temperature. When flowing EGR, this feature can help to control air/fuel ratio, with stable torque response and minimum smoke emissions.

Block 56 relates to determining an opened/closed status of an EGR valve or other similar device which may be used to meter EGR to the engine at smoke control condition. This determination may be based on any number of inputs and variables. In accordance with one non-limiting aspect of the present invention, the EGR valve status may be determined as a function of the engine speed and load. For example, the AFR minimum table may include a window 60 or other association with one or more combinations of engine loads and speeds.

This window 60 may be used to indicate operating conditions under which it is acceptable to permit the flow of EGR to the engine, i.e. when the EGR valve is opened. Likewise, operating characteristics outside of this window 60 may be used to indicate conditions under which it is unacceptable to permit the flow of EGR to the engine, i.e., the EGR valve is closed. The positioning of the window 60 and/or selection of the corresponding engine speed and load values may be determine according to any number parameters and variables, including as a function of engine operation and design characteristics and/or the desired operation thereof.

Block 64 relates to determining a maximum allowable fueling rate. The maximum allowable fueling rate may based on any number of parameters and variables. In accordance with one non-limiting aspect of the present invention, the maximum allowable fueling rate for smoke limiting may be determined as a function of the minimum AFR and the air flow rate, such as by dividing the air flow rate by the minimum AFR. The maximum fueling rate may correspond with a proper balance of fueling and smoke limiting and may be determined as a function of acceptable smoke performance.

Block 66 relates to determining an requested fueling rate. The requested fueling rate may be determined from other engine control systems and subsystem associated with standard engine operations. It may be measured, calculated, estimated, or otherwise determined.

Block 68 relates to determining if the requested fueling rate is greater than the maximum allowable fueling rate determined in block. If the requested fueling rate is less than the maximum allowable fueling rate, then proper smoke control is determined at block 70 and engine fuel control is controlled according the requested fueling rate. If the requested fueling rate is greater than the maximum allowable fueling rate, then improper smoke control is determined at block 74.

Improper smoke control may correspond with improper fueling control and/or incompatibility of the requested fueling rate with proper smoke control, such as due to changes in engine operation characteristics and/or parameters. In accordance with one non-limiting aspect of the present invention, in block 74, engine fueling is limited to the maximum allowable fueling rate so as to limiting fueling in order to improve smoke control. Likewise, block 76 relates to controlling the EGR status to permit or prevent EGR into the engine if smoke control fueling is active, as specified in block.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling an internal combustion engine having exhaust gas recirculation (EGR) capabilities, the method comprising:
   determining a minimum smoke limiting air/fuel ratio (AFR), the smoke limiting AFR being determined as a function of engine load to limit black smoke emissions;
   determining a maximum allowable fueling rate as a function of the minimum AFR and air mass flow rate to the engine, the air mass flow rate compensating for EGR flow to the engine; and
   controlling the engine according to the maximum allowable fueling rate if a requested fueling rate is greater than the maximum allowable fueling rate.

2. The method of claim 1 further comprising determining the minimum AFR as a function of an limited-increment load, the limited-increment load differing from requested engine load.

3. The method of claim 2 further comprising increasing the limited-increment engine load over time in response to a step change in requested engine load such that the limited-increment engine load increases gradually relative to the requested engine load and determining the minimum AFR as a function thereof.

4. The method of claim 3 further comprising increasing the limited-increment engine load at a constant rate.

5. The method of claim 3 further comprising increasing the limited-increment engine load at a variable rate.

6. The method of claim 2 further comprising determining the limited-increment engine load as an incremented offset from the requested engine load.

7. The method of claim 6 further comprising decreasing the incremented offset over time so as to increase the incremented engine load to approximate the actual engine load.

8. The method of claim 1 further comprising determining the minimum AFR as a function of engine load and engine speed.

9. The method of claim 8 further comprising permitting EGR flow to the engine as a function of the engine load and engine speed if the engine is controlled according to the maximum fueling rate.

10. The method of claim 8 further comprising preventing EGR flow to the engine as a function of the engine load and engine speed if the engine is controlled according to the maximum fueling rate.

11. The method of claim 8 further comprising determining the minimum AFR from a lookup table as a function of the engine load and engine speed.

12. The method of claim 8 further comprising determining the air flow rate as a function of intake charge mass flow rate and EGR mass flow rate.

13. The method of claim 1 further comprising determining the minimum AFR as a function of a requested engine load and a limited-increment load, the limited-increment load being determined as a function of the requested engine load, wherein the minimum AFR is determined as a function of the limited-increment load during fast transient engine operation.

14. The method of claim 13 further comprising determining the limited-increment to be an offset value less than the requested engine load and decreasing the offset value over time such that the limited-increment load approaches the requested engine load.

15. The method of claim 14 further comprising decreasing the offset value over time such that the limited-increment load becomes equal to the requested engine load during stead-state engine operation.

16. A method of smoke limiting an engine, the method comprising:
   determining a minimum smoke limiting air/fuel ratio (AFR), the smoke limiting AFR being determined as a function of an limited-increment load to limit smoke emissions, the limited-increment load being determined as a function of requested engine load;

determining a maximum allowable fueling rate as a function of the minimum AFR and air mass flow rate to the engine; and controlling the engine according to the maximum allowable fueling rate if a requested fueling rate is greater than the maximum allowable fueling rate.

17. The method of claim 16 further comprising increasing the limited-increment engine load over time in response to a step change in requested engine load such that the limited-increment engine load increases gradually relative to the requested engine load and determining the minimum AFR as a function thereof.

18. The method of claim 17 further comprising increasing the limited-increment engine load at a constant rate.

19. The method of claim 17 further comprising increasing the limited-increment engine load at a variable rate.

20. A method of smoke limiting an engine, the method comprising:

determining a minimum smoke limiting air/fuel ratio (AFR), the smoke limiting AFR being determined as a function of engine load and speed to limit smoke emissions;

determining a maximum allowable fueling rate as a function of the minimum AFR and air mass flow rate to the engine;

determining an exhaust gas recirculation (EGR) status as a function of the engine load and speed; and controlling the engine according to the maximum allowable fueling rate and the EGR status.

21. The method of claim 20 further comprising determining the minimum AFR as a function of a limited-increment engine load.

22. The method of claim 21 further comprising increasing the limited-increment engine load over time in response to a step change in requested engine load such that the limited-increment engine load increases gradually relative to the requested engine load and determining the minimum AFR as a function thereof.

23. The method of claim 20 further comprising controlling the engine according to the maximum allowable fueling rate only if a requested fueling rate is greater than the maximum allowable fueling rate.

* * * * *